United States Patent
Gerum

(10) Patent No.: US 8,739,529 B2
(45) Date of Patent: Jun. 3, 2014

(54) COMPRESSOR SYSTEM HAVING LIMITED SUCTION CHARGING PRESSURE AND METHOD OF OPERATING SAME

(75) Inventor: Eduard Gerum, Rosenheim (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 105 days.

(21) Appl. No.: 12/979,537

(22) Filed: Dec. 28, 2010

(65) Prior Publication Data

US 2011/0146273 A1 Jun. 23, 2011

Related U.S. Application Data

(63) Continuation of application No. PCT/EP2009/004671, filed on Jun. 29, 2009.

(30) Foreign Application Priority Data

Jul. 2, 2008 (DE) .......................... 10 2008 031 317

(51) Int. Cl.
*F02B 33/44* (2006.01)

(52) U.S. Cl.
USPC ........................................................ 60/612

(58) Field of Classification Search
USPC .................. 60/605.1, 612; 123/562
See application file for complete search history.

(56) References Cited

U.S. PATENT DOCUMENTS

| | | | | |
|---|---|---|---|---|
| 2,651,297 A * | 9/1953 | Eastman | ........................ | 123/564 |
| 2,667,150 A * | 1/1954 | Coar | ............................ | 123/562 |
| 3,204,859 A * | 9/1965 | Crooks | ........................ | 417/203 |
| 4,089,623 A | 5/1978 | Hofmann, Jr. | | |
| 4,154,060 A * | 5/1979 | Deprez et al. | .................... | 60/611 |
| 4,377,070 A * | 3/1983 | Shadbourne | ..................... | 60/602 |
| 5,906,480 A * | 5/1999 | Sabelstrom et al. | ............ | 60/609 |
| 6,138,616 A | 10/2000 | Svensson | | |
| 6,637,205 B1 | 10/2003 | Ahmad et al. | | |
| 6,848,641 B2 * | 2/2005 | Lohmann et al. | ............. | 242/131 |
| 7,111,462 B2 * | 9/2006 | Epstein | ........................... | 60/774 |
| 7,210,296 B2 | 5/2007 | Bolz et al | | |
| 2003/0140630 A1 | 7/2003 | Baeuerle et al. | | |
| 2004/0194466 A1* | 10/2004 | Kawamura et al. | ............. | 60/612 |

(Continued)

FOREIGN PATENT DOCUMENTS

DE 2 204 185 8/1973
DE 25 00 040 A1 7/1976

(Continued)

OTHER PUBLICATIONS

German Office Action dated Nov. 25, 2009 including English-language translation (Six (6) pages).

(Continued)

*Primary Examiner* — Mary A Davis
(74) *Attorney, Agent, or Firm* — Crowell & Moring LLP

(57) ABSTRACT

A compressor system for a vehicle includes a compressor driven by a drive motor of the vehicle and a suction air conduit for supplying air that has already been precompressed by a turbocharger of the drive motor to the compressor. A mechanism is disposed in the suction air guide for reducing the flow cross-section. The mechanism is able to limit the charging pressure of the already precompressed air supplied to the compressor. A method for controlling a compressor system having a turbocharged compressor limits a charging pressure of the already precompressed air to an adjustable maximum value.

18 Claims, 5 Drawing Sheets

(56) References Cited

U.S. PATENT DOCUMENTS

| | | | |
|---|---|---|---|
| 2007/0080514 A1* | 4/2007 | Stender et al. | 280/124.157 |
| 2007/0119168 A1* | 5/2007 | Turner | 60/612 |
| 2007/0246008 A1* | 10/2007 | Gerum | 123/316 |
| 2008/0011278 A1* | 1/2008 | Yamagata | 123/562 |
| 2009/0007563 A1* | 1/2009 | Cooper et al. | 60/612 |
| 2009/0095253 A1 | 4/2009 | Bergbauer et al. | |
| 2009/0139230 A1* | 6/2009 | Baldwin et al. | 60/612 |
| 2010/0139266 A1* | 6/2010 | Gerum | 60/600 |
| 2010/0244550 A1* | 9/2010 | Hilberer | 303/15 |
| 2012/0067044 A1* | 3/2012 | Marx et al. | 60/611 |

FOREIGN PATENT DOCUMENTS

| | | | | |
|---|---|---|---|---|
| DE | 77 36 864 U1 | | 4/1978 | |
| DE | 29 20 685 A1 | | 12/1980 | |
| DE | 36 07 659 A1 | | 10/1986 | |
| DE | 195 10 206 A1 | | 9/1996 | |
| DE | 19637571 A1 | * | 3/1998 | |
| DE | 101 24 543 A1 | | 11/2002 | |
| DE | 10253340 A1 | * | 11/2003 | F15B 9/08 |
| DE | 697 18 458 T2 | | 1/2004 | |
| DE | 10 2005 031 744 A1 | | 1/2007 | |
| GB | 2 049 823 A | | 12/1980 | |
| GB | 2 174 787 A | | 11/1986 | |
| JP | 62228625 A | * | 10/1987 | F02B 37/04 |
| WO | WO 2007/083131 A1 | | 7/2007 | |
| WO | WO 2007/111919 A1 | | 10/2007 | |

OTHER PUBLICATIONS

International Search Report dated Sep. 30, 2009 including English-language translation (Six (6) pages).

* cited by examiner

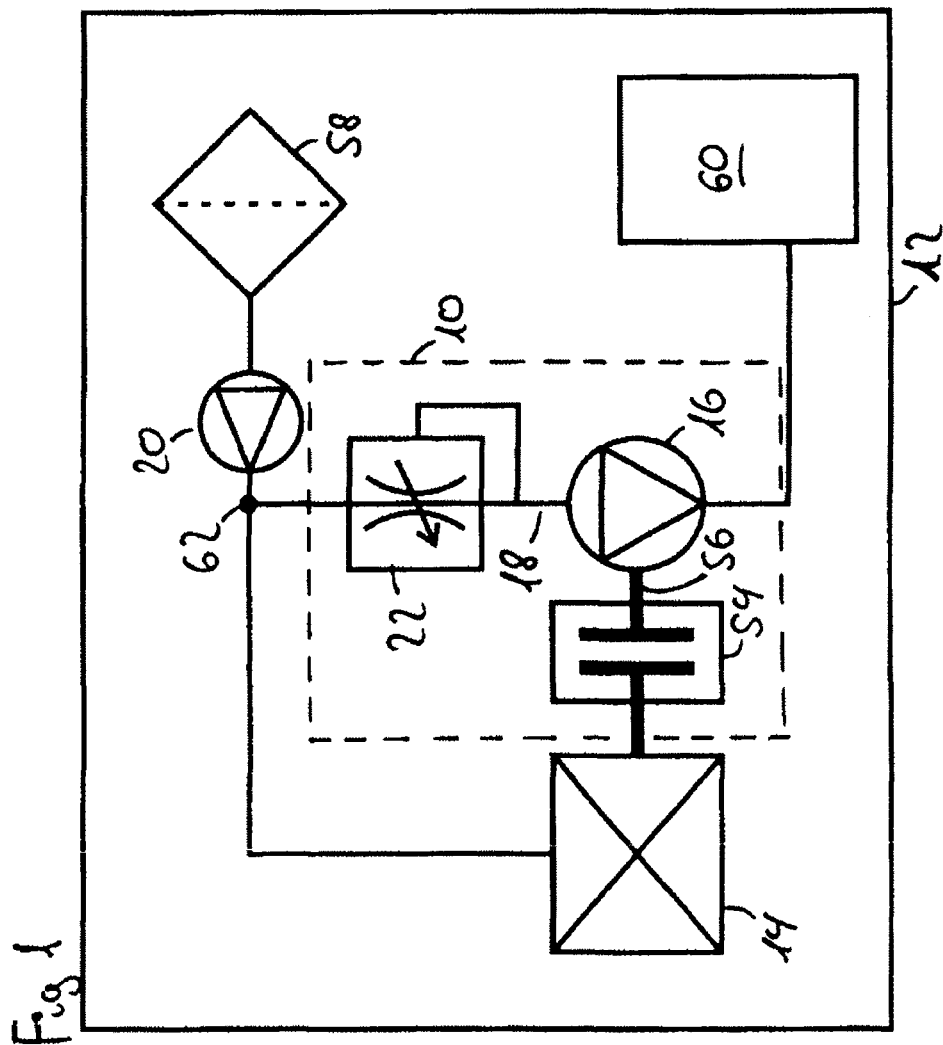

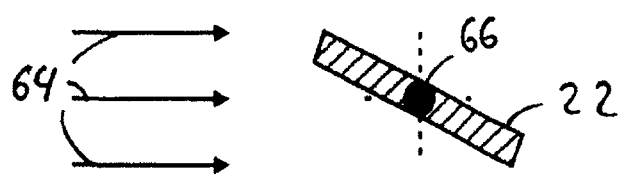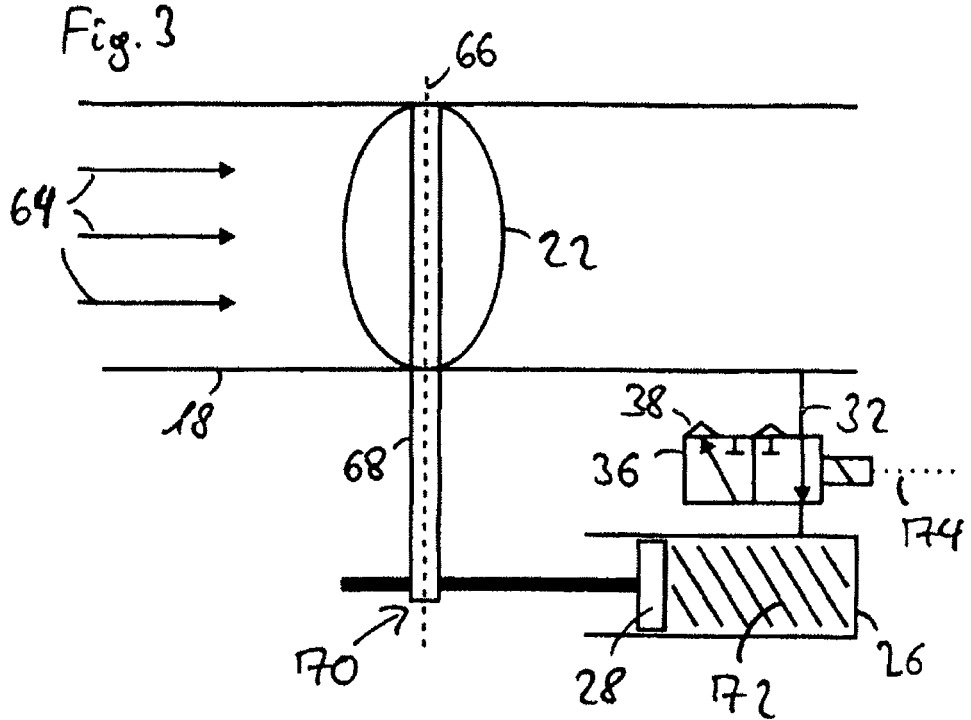

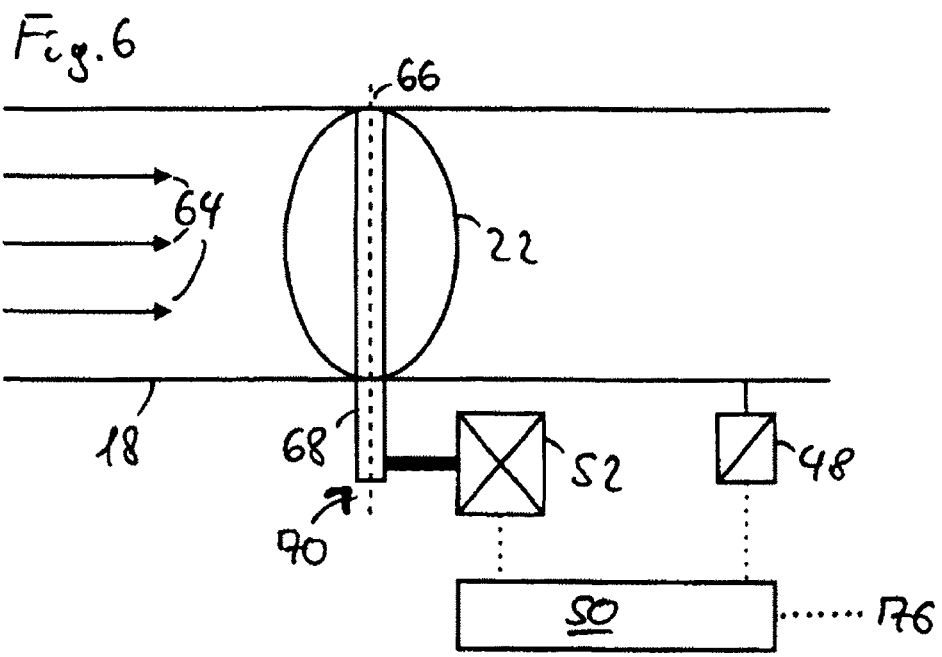
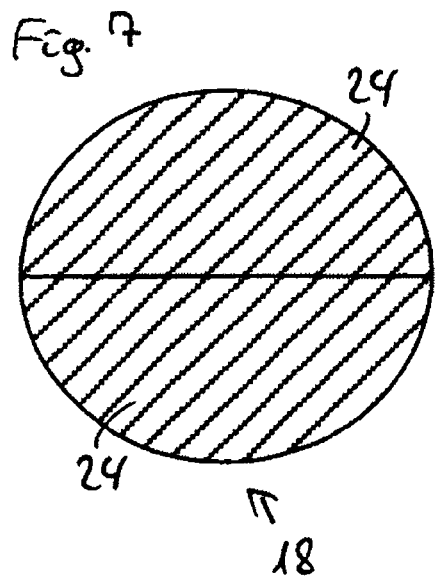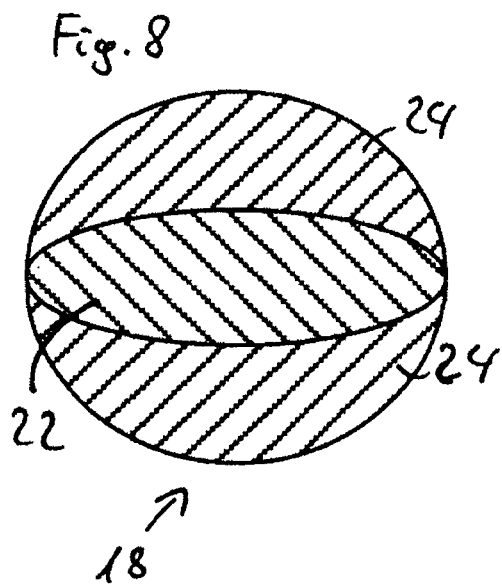

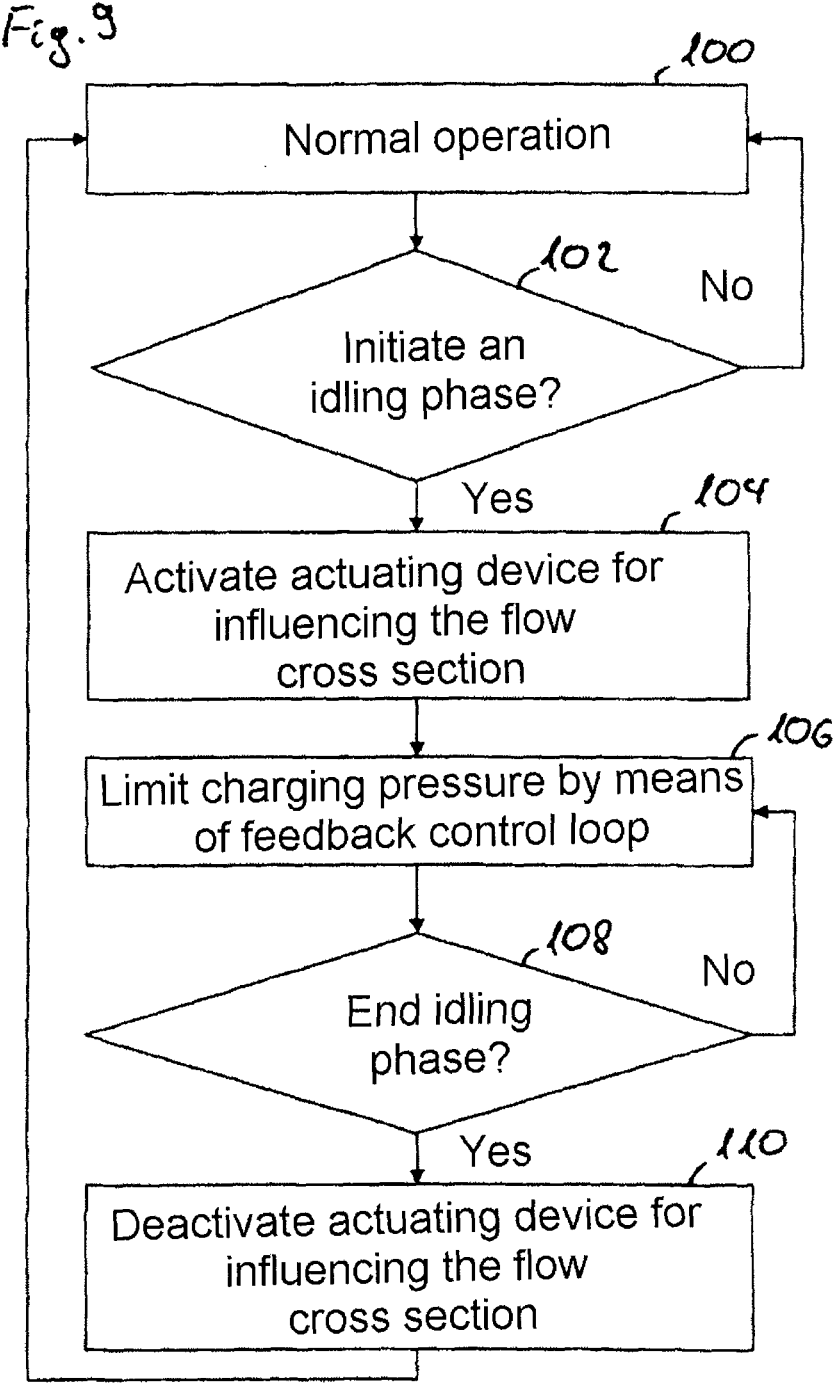

COMPRESSOR SYSTEM HAVING LIMITED SUCTION CHARGING PRESSURE AND METHOD OF OPERATING SAME

CROSS-REFERENCE TO RELATED APPLICATIONS

This application is a continuation of PCT International Application No. PCT/EP2009/004671, filed Jun. 29, 2009, which claims priority under 35 U.S.C. §119 from German Patent Application No. DE 10 2008 031 317.3, filed Jul. 2, 2008, the entire disclosures of which are herein expressly incorporated by reference.

BACKGROUND AND SUMMARY OF THE INVENTION

The invention relates to a compressor system for a vehicle, having a compressor driven by a drive motor of the vehicle, and a suction air conduit for supplying air that has already been precompressed by a turbocharger of the drive motor to the compressor.

The invention furthermore relates to a method for operating a compressor system for a vehicle, having a compressor driven by a drive motor of the vehicle, and a suction air conduit for supplying air that has already been precompressed by a turbocharger of the drive motor to the compressor.

Vehicles with air-operated component systems, e.g. a pneumatic suspension or air brakes, generally have a compressor driven by a drive motor of the vehicle for the purpose of producing the required compressed air. To increase the energy efficiency of the vehicle, the drive motor used is often fitted with a turbocharger. The compressor driven by the drive motor is generally designed as a compressor which draws in ambient air. The performance of the compressor can be significantly enhanced if it is also pressure-charged. This can be accomplished, for example, by drawing in already precompressed air downstream of a compressor of the turbocharger and of an associated charge air cooler. A disproportionate increase in the air volume delivered and better efficiency is thereby achieved through a reduction in flow losses in the intake system of the compressor. Another advantage is the reduction in oil consumption, which essentially follows from the fact that there is no vacuum in the cylinder during an air intake phase, in contrast to a conventional compressor, which draws in ambient air.

However, one disadvantage of a pressure-charged compressor is that, in blow-off mode, i.e. in an idling phase, in which the compressor is not delivering any compressed air into the supply system of the vehicle, it continues to deliver a large volume of air, and this results in a significantly higher power loss in this operating condition than is the case with a conventional compressor, which draws in ambient air.

It is therefore the underlying object of the invention to eliminate this disadvantage, at least in part, while at the same time ensuring that the oil consumption of the compressor remains at a low level.

This and other objects are achieved by a compressor system for a vehicle, having a compressor driven by a drive motor of the vehicle, and a suction air conduit for supplying air that has already been precompressed by a turbocharger of the drive motor to the compressor. A mechanism for reducing the flow cross section is disposed in the suction air conduit. The mechanism is used to limit the charging pressure of the already precompressed air supplied to the compressor.

By disposing the mechanism for reducing the flow cross section in the suction air conduit, it is possible, by way of the backpressure produced, to achieve any desired reduction in the charging pressure supplied to the pressure-charged compressor. In particular, the charging pressure supplied to the compressor can be reduced in a blow-off or idling phase, thus reducing the volume of air delivered in the idling phase, which reduces the power consumption of the compressor. Examples of mechanisms that can be used for reducing the flow cross section are a throttle flap, a slide, which can be pushed into the suction air conduit perpendicularly to the direction of air flow, or a rotatably mounted ball pierced by a hole, of the kind known from a ball valve, for example.

It is advantageous here if provision is made for the mechanism for reducing the flow cross section to be actuable mechanically by a pneumatic working cylinder. The use of a pneumatic working cylinder for actuating the mechanism for reducing the flow cross section allows rapid and precise adaptation of the exposed flow cross section of the suction air conduit and hence, by way of the adaptation of the backpressure caused, adaptation of the charging pressure provided for the compressor.

It is particularly preferred that the working cylinder comprises a mobile piston. The use of a working cylinder with a mobile piston makes it possible to construct an extremely robust pneumatically driven actuating mechanism with a lever travel of any desired length which can be defined by the length of the working cylinder.

As an alternative, however, it is also possible to make provision for the working cylinder to comprise a flexible diaphragm. The use of a flexible diaphragm instead of a mobile piston makes possible, in particular, shorter response times for the working cylinder since the mass inertia to be overcome is lower. This is advantageous particularly in the case of short idling phases.

Ideally, provision is made to enable the pneumatic working cylinder to be supplied via a pneumatic control line with the charging pressure prevailing downstream of the mechanism for reducing the flow cross section. Supplying the working cylinder directly with the charging pressure prevailing downstream of the mechanism for reducing the flow cross section allows self-adaptation of the charging pressure provided and the flow cross section exposed. If the charging pressure provided is greater than that allowed, the exposed flow cross section is reduced by activating the working cylinder by way of a mechanism, as a result of which, in turn, the charging pressure provided is reduced. Conversely, if the charging pressure provided is too low, the working cylinder is deflected to a lesser extent, thereby enlarging the exposed flow cross section, which results in a higher charging pressure being provided. However, the maximum value of the charging pressure provided cannot exceed the charging pressure prevailing upstream of the mechanism for reducing the flow cross section.

Provision can be made to enable the pneumatic working cylinder to be supplied with a working pressure via a relay valve, it being possible for a pneumatic control input of the relay valve to be supplied via a pneumatic control line with the charging pressure prevailing downstream of the mechanism for reducing the flow cross section. The use of a relay valve enables the working cylinder to be activated with a higher pressure level, exhibiting larger pressure fluctuations, than the pressure fluctuations downstream of the mechanism for reducing the flow cross section. As a result, the working cylinder can be activated more precisely.

It is expedient if provision is made for a 3/2-way valve with its own vent to be disposed in the pneumatic control line to enable the control line to be set to a depressurized condition. Providing a 3/2-way valve with its own vent in the pneumatic control line makes it possible to prevent actuation of the working cylinder. When the pneumatic control line is set to a depressurized condition, a maximum possible charging pressure is provided for the compressor since the mechanism for reducing the flow cross section disposed in the suction air conduit then produce the minimum possible backpressure.

One advantageous possibility is to provide for the compressor system to include an electrically activatable continuously variable valve with a pneumatic supply pressure input, an electric control input and a pneumatic output for actuating the working cylinder, for the charging pressure prevailing downstream of the mechanism for reducing the flow cross section to be detectable by a pressure sensor, and for the compressor system to include an electronic control unit which is suitable for producing an electric control signal for actuating the continuously variable valve as a function of the charging pressure determined in order to limit the charging pressure. The use of an electrically activatable continuously variable valve, a term denoting a directional control valve which does not operate in discrete steps but allows a continuous transition between the control positions, in combination with the pressure sensor disposed downstream of the flow cross section reduction mechanism allows precise actuation of the flow cross section reduction mechanism. In particular, the continuously variable valve can be embodied as a proportional valve with a nonlinear volume flow characteristic, as a control valve with a linear volume flow characteristic or as a servo valve, i.e. a directional control valve with analog activation capability. The use of a pressure sensor avoids unconditioned air precompressed by the turbocharger being used for direct or indirect actuation of the mechanism for reducing the flow cross section. In particular, since the air precompressed by the turbocharger has not yet been dried, the pneumatic devices used to actuate the flow cross section reduction mechanism are protected in an effective manner from corrosion.

In this context, it is also contemplated for the mechanism for reducing the flow cross section to be actuable by an electrically activatable servomotor. Using an electrically activatable servomotor likewise makes it possible to avoid corrosion-induced failure of the pneumatic/mechanical actuating device.

It may furthermore be useful for the compressor system to include an electric control unit which is suitable for producing an electric control signal for activating the electrically activatable servomotor in order to limit the charging pressure, the control signal being based on a charging pressure determined by a pressure sensor downstream of the mechanism for reducing the flow cross section. Using an electronic control unit together with a servomotor to actuate the mechanism for reducing the flow cross section allows flexible adaptation of the charging pressure supplied to the compressor.

Provision can furthermore be made for the compressor system to include a clutch assigned to the compressor, which is suitable for decoupling the compressor completely from the drive motor. Using a clutch to decouple the compressor completely from the drive motor makes it possible to reduce to zero both the oil discharge and the energy consumption of the compressor in an idling phase.

The method of the invention is such that the charging pressure of the already precompressed air supplied to the compressor is limited by an actuating mechanism for reducing the flow cross section to an adjustable maximum value, which mechanism is disposed in the suction air conduit. In this way, the advantages and special features of the compressor system according to the invention are also exploited in the context of a method for operating a compressor system.

This also applies to the particularly preferred embodiments of the method according to the invention which are given below.

The method is developed further in an expedient manner if the maximum value chosen varies as a function of the operating condition. Adapting the maximum value of the charging air supplied to the compressor to the operating condition of the compressor system allows optimization of the operating behavior of the compressor system. It is possible, for example, in an idling phase, to reduce the energy consumption of the compressor by lowering the charging pressure provided, while a maximum possible charging pressure is provided for the compressor in a delivery phase of the compressor system at a low compressor speed in order to maximize the air volume delivered. Moreover, it is likewise possible to specify a maximum permissible charging pressure of the compressor in a delivery phase of the compressor system in order, in particular, to limit the thermal stress on the compressor.

It is advantageous to make provision for the maximum value in an idling phase to be chosen as a function of at least one of the following variables: oil ejected by the compressor, power loss of the compressor. In order to minimize the power loss of the compressor in an idling phase, the charging pressure provided for the compressor should be as low as possible. The charging pressure provided should ideally correspond to ambient pressure, as a result of which the power loss of the compressor would be identical with the power loss of a compressor that draws in ambient air. At the same time, however, the compressor should eject as little oil as possible, with the amount of oil ejected by the compressor rising as the charging pressure falls, owing to the increasing vacuum in the piston space during a suction phase. It is therefore advantageous to determine the maximum permissible charging pressure as a function of the permissible power loss in an idling phase and the permissible oil ejection in an idling phase.

It is particularly preferred that, when the adjustable maximum value is exceeded, the charging pressure supplied to the compressor be held constant, irrespective of the compressor speed and the charging pressure provided by the turbocharger, by dynamic adaptation of the flow cross section exposed by the mechanism for reducing the flow cross section. The dynamic adaptation of the charging pressure supplied to the compressor, in an idling phase for example, keeps the amount of oil ejected by the compressor, in particular, to a constantly low level.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a schematic representation of a vehicle with a compressor system according to an aspect of the invention;

FIG. 2 shows a cross section from the side of a suction air conduit having a flow cross section reduction mechanism;

FIG. 3 shows a first embodiment of a suction air conduit having a mechanism for reducing the flow cross section and an associated actuating device;

FIG. 6 shows a fourth embodiment of a suction air conduit having a mechanism for reducing the flow cross section and an associated actuating device;

FIG. 7 shows a first possible flow cross section of a suction air conduit;

FIG. 8 shows a second possible flow cross section of a suction air conduit; and

FIG. 9 shows a flow diagram to illustrate the method according to the invention.

DETAILED DESCRIPTION OF THE DRAWINGS

Figure 4:
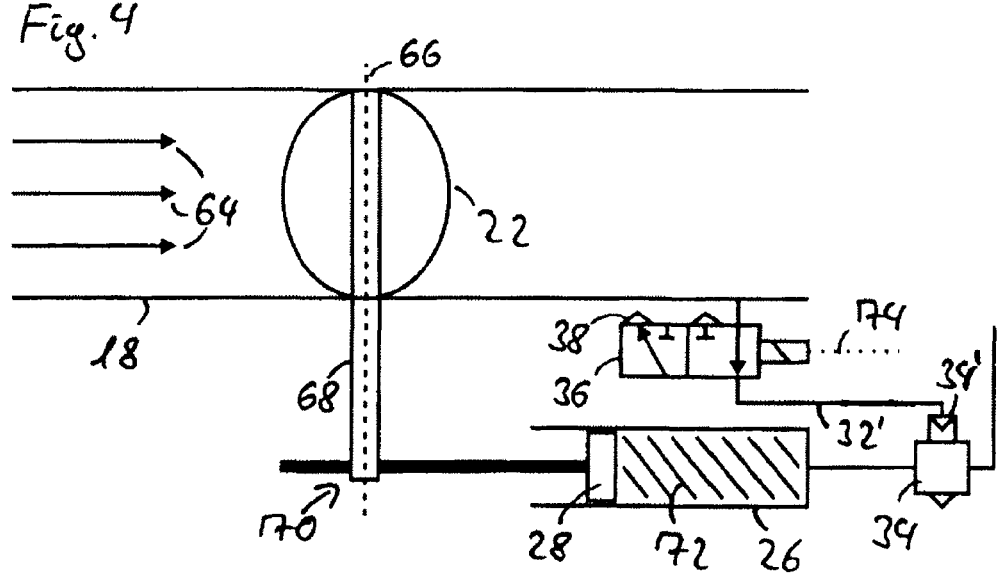
FIG. 4 shows a second embodiment of a suction air conduit having a mechanism for reducing the flow cross section and an associated actuating device.

In the following drawings, identical reference signs denote identical or similar parts.

FIG. 1 shows a schematic representation of a vehicle having a compressor system. In addition to the compressor system 10 according to aspects of the invention, the vehicle 12 illustrated includes a drive motor 14, a turbocharger 20, an air filter 58 and a compressed air conditioning system 60. The compressor system 10 itself comprises a compressor 16, a clutch 54 for separating the compressor 16, which is coupled to the drive motor 14 by way of a drive shaft 56, from the drive motor 14, and mechanism 22, disposed in a suction air conduit 18 for reducing the flow cross section of the suction air conduit 18. The suction air conduit 18 is coupled to a joint 62, allowing air which has already been precompressed by the turbocharger 20 to be supplied to the compressor 16.

The turbocharger 20 is driven in a conventional manner by exhaust gases from the drive motor 14 and supplies the drive motor 14 with precompressed combustion air, ambient air being drawn in via the air filter 58 and being compressed by the turbocharger 20. Part of the precompressed air is diverted at the joint 62 and supplied via the suction air conduit 18 to the compressor 16, which, in turn, is driven by the drive motor 14 by way of the drive shaft 56.

The compressor 16 further compresses the air which has already been precompressed by the turbocharger 20 and supplies it to the compressed air conditioning system 60, which conditions the compressed air in a manner known to a person skilled in the art, that is to say, in particular, frees it from oil and dirt particles and from moisture. The charging pressure provided by the turbocharger 20 fluctuates as a function of the volume of the exhaust gas flow from the drive motor 14, by which flow it is driven.

In order to protect the compressor 16 from a thermal overload in the event of an extremely high charging pressure, the mechanism 22 for reducing the flow cross section in the suction air conduit 18 can produce a variable backpressure, thus ensuring that the compressor 16 is no longer supplied with the full charging pressure provided by the turbocharger 20. Above a certain adjustable level of the charging pressure provided by the turbocharger, the charging pressure supplied to the compressor can be held constant by the mechanism 22 for reducing the flow cross section. This is also worthwhile especially when the compressed air reservoirs (not shown) of the vehicle 12 are full, i.e. when there is no immediate need for any more compressed air. In this case, the compressor 16 is switched to an idling phase, and it should then consume as little energy as possible and, at the same time, eject little oil, i.e. delivers a small quantity of oil together with the air.

By reducing the charging pressure supplied to the compressor 16, i.e. by reducing the flow cross section of the suction air conduit 18, it is possible to reduce the air volume delivered by the compressor 16 in such a blow-off phase, thereby enabling the power loss of the compressor to be reduced. In this case, the charging pressure that is still supplied to the compressor should be as close as possible to ambient pressure, ensuring that the power loss of the compressor 16 corresponds to the power loss of a compressor which draws in ambient air. However, since the amount of oil ejected by the compressor rises as the vacuum in the piston space of the compressor during a suction phase increases, reducing the charging pressure provided to the compressor 16 to ambient pressure is worthwhile only to a limited extent.

In order to keep the oil discharge by the compressor 16 low, the compressor 16 is supplied with a slightly higher charging pressure than ambient pressure, and the power loss of the compressor 16 is slightly above the achievable minimum. This procedure is suitable especially with short idling phases, during which no compressed air is delivered. If the idling phase of the compressor 16 lasts for a longer time, the compressor 16 can be put out of operation completely by means of the clutch 54. In this condition, both the air volume delivered by the compressor 16 and the unwanted oil discharge fall to zero.

FIG. 2 shows a cross section from the side of a suction air conduit having a mechanism for reducing the flow cross section. Within the suction air conduit 18 illustrated in FIG. 2 is a throttle flap 22 mounted on a pivot 66. The precompressed air, which flows in one direction 64 of flow through the suction air conduit 18 must flow around the throttle flap 22, giving rise to a backpressure in the suction air conduit 18. The backpressure caused by the throttle flap 22 depends on the angular position of the throttle flap 22 in relation to the direction 64 of flow of the precompressed air supplied. In addition to the option, illustrated in FIG. 2, of a throttle flap 22 rotatably mounted on a pivot 66, a slide which can be pushed into the suction air conduit 18, preferably at right angles to the direction 64 of flow, is also possible producing a backpressure in the suction air conduit 18 in a similar way. It is also contemplated to use a ball with a through hole mounted in such a way as to be rotatable about a spindle, of the kind known to a person skilled in the art in connection with a ball valve, for example.

FIG. 3 shows a first embodiment of a suction air conduit having a mechanism for reducing the flow cross section and an associated actuating device. The suction air conduit 18 illustrated in FIG. 3 corresponds to the suction air conduit illustrated in FIG. 2, the direction of view now being turned through 90° relative to the direction of view in FIG. 2, with the result that the pivot 66 lies in the plane of the drawing.

The throttle flap 22 illustrated is actuated by a pneumatic working cylinder 26 having a displaceable piston 28 by way of a turning rod 68 and a conversion device 70, which is not shown in detail. The conversion device 70 converts the linear motion of the piston 28 in the working cylinder 26 into a rotary motion of the turning rod 68, and therefore supplying air to or releasing air from the working cylinder 26 results in the rotation of the throttle flap 22 about the pivot 66. Disposed within the working cylinder 26 there is furthermore a return spring 72, which defines the position of the piston 28 as long as the working cylinder 26 is vented.

Air is supplied to and released from the working cylinder 26 via a pneumatic control line 32, in which a 3/2-way valve 36 with its own vent 38 is disposed. The 3/2-way valve 36 can be actuated by way of an electric line 74. In this way, the charging pressure prevailing downstream of the throttle flap 22 can be influenced by activating the 3/2-way valve 36 by way of the electric line 74. If the intention is to influence, that is to say, in particular, to limit the charging pressure downstream of the throttle flap 22, the 3/2-way valve 36 is moved into its illustrated control position. In this condition, the working cylinder 26 is coupled to the suction air conduit 18 via the pneumatic control line 32 downstream of the throttle flap 22. The charging pressure prevailing downstream of the throttle flap 22 can therefore deflect the piston 28 from its rest position defined by the return spring 72, thereby turning the throttle flap about the pivot 66. However, this does not change the charging pressure prevailing downstream of the throttle flap 22, and there is therefore feedback. If there is no desire to influence the charging pressure downstream of the throttle flap 22, the 3/2-way valve 36 can be transferred to the control position thereof which is not shown, as a result of which the working cylinder 26 is vented by way of the vent 38. The piston 28 then returns to its rest position defined by the return spring 72. Instead of a piston 28 that can be moved in the working cylinder 26, it is also possible to use a flexible diaphragm, the elastic deformation of which is then converted into a rotary motion of the throttle flap 22 by an appropriate conversion device 70.

FIG. 4 shows a second embodiment of a suction air conduit having a mechanism for reducing the flow cross section and an associated actuating device. In contrast to the actuating device illustrated in FIG. 3, the working cylinder 26 is now activated by way of a relay valve 34 with its own vent. The relay valve 34 has a control input 34', which can be supplied with pressure by a pneumatic control line 32'. Disposed in the pneumatic control line 32' there is once again a 3/2-way valve 36 having its own vent 38, which valve can be actuated by way of an electric line 74. The relay valve 34 converts the control pressures applied to the control input 34' in the form of a pressure intensification, thus enabling the working cylinder 26 to apply a larger force for actuation of the mechanism 22 for reducing the flow cross section. Moreover, the working cylinder 26 is no longer in direct contact with the as yet unconditioned compressed air since the supply pressure of the relay valve 34 is advantageously taken downstream of the compressed air conditioning system 60 known from FIG. 1.

Figure 5:
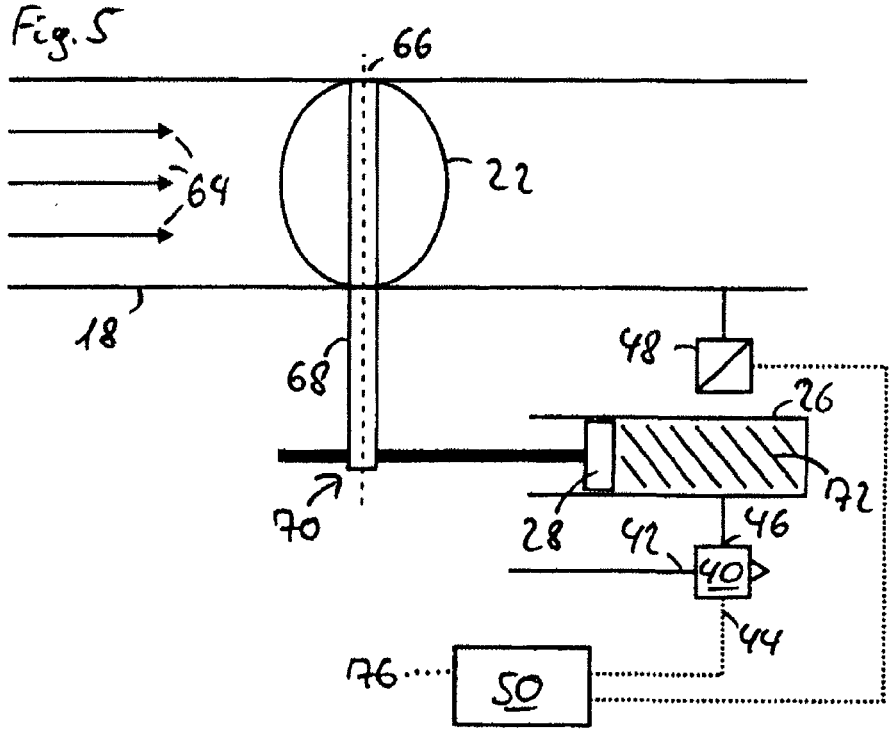
FIG. 5 shows a third embodiment of a suction air conduit having a mechanism for reducing the flow cross section and an associated actuating device.

FIG. 5 shows a third embodiment of a suction air conduit having a mechanism for reducing the flow cross section and an associated actuating device. The charging pressure prevailing downstream of the mechanism 22 for reducing the flow cross section is now determined by a pressure sensor 48 and transmitted to an electronic control unit 50 as an electric signal. The electronic control unit 50 then controls a continuously variable valve 40 having an electric control input 44, a pneumatic supply pressure input 42 and a pneumatic output 46 in order to actuate the working cylinder 26. The continuously variable valve 40 has its own vent and can be embodied as a proportional valve, as a directional control valve or as a servo valve, for example.

The electronic control unit 50 furthermore has a connection 76 to a vehicle bus, e.g. the CAN bus, thereby allowing external activation of the electronic control unit 50. For example, the electronic control unit 50 can be instructed via the connection 76 to initiate or set influencing of the charging pressure provided downstream of the mechanism 22 for reducing the flow cross section, this corresponding to the functionality of the 3/2-way valve 36 in FIGS. 3 and 4. The use of different maximum charging pressures provided can furthermore be implemented in a simple manner. The electronic control unit 50 varies the activation of the continuously variable valve 40 as a function of the pressure, measured by the pressure sensor 48, downstream of the mechanism 22 for reducing the flow cross section, thereby ensuring feedback in this embodiment too.

FIG. 6 shows a fourth embodiment of a suction air conduit having a mechanism for reducing the flow cross section and an associated actuating device. In contrast to FIGS. 3 to 5, actuation of the mechanism 22 for reducing the flow cross section in this embodiment is accomplished directly by way of a servomotor 52. The servomotor 52 receives a control signal from the electronic control unit 50 on the basis of the pressure measured by the pressure sensor 48 and the signals transmitted to the control unit by way of connection 76.

FIG. 7 shows a first possible flow cross section of a suction air conduit. An illustrated flow cross section 24 corresponds substantially to the full cross section of the suction air conduit 18. The mechanism 22 known from FIGS. 2 to 6 for reducing the flow cross section are visible only as a thin line since, in this position of the throttle flap, the maximum flow cross section 24 of the suction air conduit 18 is exposed and no additional backpressure is produced.

FIG. 8 shows a second possible flow cross section of a suction air conduit. In the position of the throttle flap 22 illustrated in FIG. 8, part of the cross section of the suction air conduit 18 is covered by the throttle flap 22 in the direction of flow, with the result that the flow cross section 24 is no longer identical with the cross section of the suction air conduit 18. In this case, the throttle flap 22 produces a backpressure which is not negligible.

FIG. 9 is a flow diagram illustrating the method according to an embodiment of the invention. The method starts at step 100 in normal operation. Here, normal operation denotes a delivery phase of the compressor 16 known from FIG. 1, in which either the mechanism 22, known from FIG. 1, for reducing the flow cross section is deactivated or a maximum permissible charging pressure is specified for the compressor 16 in order to protect the latter from thermal overload. If no idling phase is then initiated in step 102, 102—NO, the routine continues with step 100. However, if an idling phase of the compressor is initiated, 102—YES, the actuating device for the mechanism for influencing the flow cross section is activated in step 104 or, if they have already been activated, a lower maximum permissible charging pressure is set. Subsequently, the charging pressure supplied to the compressor is limited by way of the feedback control loop in step 106. If the idling phase of the compressor is not then ended in step 108, 108—NO, the routine continues with step 106. If the idling phase has been ended, 108—YES, the actuating device for influencing the flow cross section is deactivated again in step 110 or the maximum value for the charging pressure previously permitted in normal operation is set again. The routine then continues with step 100.

TABLE OF REFERENCE NUMERALS

10 Compressor system
12 Vehicle
14 Drive motor
16 Compressor
18 Suction air conduit
20 Turbocharger
22 Throttle flap
24 Flow cross section
26 Pneumatic working cylinder
28 Piston
32 Pneumatic control line
32' Pneumatic control line
34 Relay valve
34' Pneumatic control input
36 3/2-way valve
38 Vent
40 Continuously variable valve
42 Pneumatic supply pressure input 44 Electric control input
46 Pneumatic output
48 Pressure sensor
50 Electronic control unit
52 Servomotor
54 Clutch
56 Drive shaft
58 Air filter
60 Compressed air conditioning system
62 Joint
64 Direction of flow
66 Pivot
68 Turning rod
70 Conversion device
72 Return spring
74 Electric line
76 CAN connection
100 Normal operation
102 Initiate idling phase?
104 Activate actuating device for influencing the flow cross section
106 Limit charging pressure by means of feedback control loop
108 End idling phase?
110 Deactivate actuating device for influencing the flow cross section The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressor system for use in a vehicle having a drive motor, the compressor system comprising:
   a compressor drivable by the drive motor of the vehicle;
   a suction air conduit supplying to the compressor precompressed air from a turbocharger of the drive motor; and
   a flow cross-section reduction mechanism operatively disposed in the suction air conduit, said flow cross-section reduction mechanism limits a charging pressure of the precompressed air supplied to the compressor,
   wherein the compressor is configured to further compress the air precompressed by the turbocharger and supply the further compressed air to a compressed air conditioning system which removes oil, moisture and dirt particles from the further compressed air, said compressed air conditioning system being separate from the drive motor.

2. The compressor system according to claim 1, further comprising a pneumatic working cylinder operatively configured for actuating mechanically the flow cross-section reduction mechanism.

3. The compressor system according to claim 2, wherein a working cylinder of the pneumatic working cylinder comprises a displaceable piston.

4. The compressor system according to claim 2, wherein a working cylinder of the pneumatic working cylinder comprises a flexible diaphragm.

5. The compressor system according to claim 2, further comprising a pneumatic control line operatively configured for supplying the pneumatic working cylinder with a charge pressure prevailing downstream of the flow cross-section reduction mechanism disposed in the suction air conduit.

6. The compressor system according to claim 5, further comprising:
   a 3/2-way valve disposed in the pneumatic control line to enable the pneumatic control line to be set to a depressurized condition, the 3/2-way valve having a dedicated vent.

7. The compressor system according to claim 2, further comprising:
   a relay valve by which the pneumatic working cylinder is supplyable with a working pressure; and
   a pneumatic control line for supplying a pneumatic control input of the relay valve with a charging pressure prevailing downstream of the flow cross-section reduction mechanism.

8. The compressor system according to claim 7, further comprising:
   a 3/2-way valve disposed in the pneumatic control line to enable the pneumatic control line to be set to a depressurized condition, the 3/2-way valve having a dedicated vent.

9. The compressor system according to claim 2, further comprising:
   an electrically activatable continuously variable valve having a pneumatic supply pressure input, an electric control input, and a pneumatic output for actuating the pneumatic working cylinder;
   a pressure sensor for detecting the charging pressure prevailing downstream of the flow cross-section reduction mechanism; and
   an electronic control unit operably configured to produce an electric control signal for actuating the continuously variable valve as a function of the detected charge pressure in order to limit the charge pressure.

10. The compressor system according to claim 1, further comprising an electrically activatable servo motor for actuating the flow cross-section reduction mechanism.

11. The compressor system according to claim 10, further comprising:
    an electronic control unit operably configured to produce an electric control signal for activating the electrically activatable servo motor in order to limit the charging pressure, the electric control signal being based on a charging pressure determined by a pressure sensor arranged downstream of the flow cross-section reduction mechanism.

12. The compressor system according to claim 1, further comprising a clutch assigned to the compressor, said clutch being operatively configured for decoupling the compressor from the drive motor.

13. A method for operating a compressor system of a vehicle having a drive motor and a turbocharger, the method comprising the acts of:
    driving the compressor via the drive motor;
    supplying air that has already been precompressed by the turbocharger of the drive motor to the compressor via a suction air conduit;
    limiting a charging pressure of the already precompressed air supplied to the compressor via a flow cross-section reduction mechanism operatively disposed in the suction air conduit;
    the compressor further compressing the air precompressed by the turbocharger;
    supplying the further compressed air to a compressed air conditioning system;
    removing oil, moisture and dirt particles from the further compressed air by the compressed air conditioning system, wherein said compressed air conditioning system is separate from the drive motor.

14. The method according to claim 13, further comprising the act of:
    selecting a maximum value of the charging pressure as a function of an operating condition of the compressor system.

15. The method according to claim 14, wherein the selected maximum value in an idling phase of the compressor system is selected as a function of at least one of the following variables:
    (a) oil ejected by the compressor; and
    (b) power loss of the compressor.

16. The method according to claim 15, further comprising the act of:
    if the adjustable maximum value is exceeded, holding the charging pressure supplied to the compressor constant irrespective of compressor speed and the charging pressure provided by the turbo charger via a dynamic adaptation of a flow cross-section of the suction air conduit using the flow cross-section reduction mechanism.

17. The method according to claim 14, further comprising the act of:
    if the adjustable maximum value is exceeded, holding the charging pressure supplied to the compressor constant irrespective of compressor speed and the charging pressure provided by the turbo charger via a dynamic adaptation of a flow cross-section of the suction air conduit using the flow cross-section reduction mechanism.

18. The method according to claim 13, further comprising the act of:
    if the adjustable maximum value is exceeded, holding the charging pressure supplied to the compressor constant irrespective of compressor speed and the charging pressure provided by the turbo charger via a dynamic adaptation of a flow cross-section of the suction air conduit using the flow cross-section reduction mechanism.

* * * * *